United States Patent [19]

Ishii et al.

[11] 3,852,449

[45] Dec. 3, 1974

[54] TREATMENT AND PREVENTION OF COCCIDIOSIS IN POULTRY

[75] Inventors: Toshio Ishii; Yasuto Takamatsu, both of Tokyo; Shojiro Yurugi, Kyoto; Katsutada Masuda, Ashiya, all of Japan

[73] Assignee: Takeda Chemical Industries, Ltd., Osaka, Japan

[22] Filed: Oct. 26, 1971

[21] Appl. No.: 192,326

Related U.S. Application Data

[60] Division of Ser. No. 7,362, Jan. 30, 1970, which is a continuation of Ser. No. 621,753, March 9, 1967, abandoned.

[30] Foreign Application Priority Data

May 30, 1966 Japan.............................. 41-34922

[52] U.S. Cl. ............................................... 424/251
[51] Int. Cl............................................. A61k 27/00
[58] Field of Search .................................. 424/251

[56] References Cited
UNITED STATES PATENTS

| | | | |
|---|---|---|---|
| 2,844,579 | 7/1958 | Turner et al.................. | 260/256.6 |
| 3,088,867 | 5/1963 | Rogers et al................. | 424/251 |
| 3,268,403 | 8/1966 | Rogers et al................. | 424/251 |

*Primary Examiner*—Sam Rosen
*Attorney, Agent, or Firm*—Wenderoth, Lind & Ponack

[57] ABSTRACT

Thiazolium mono salt (nitrate, nitrite, iodide, thiocyanate, perchlorate) of the formula

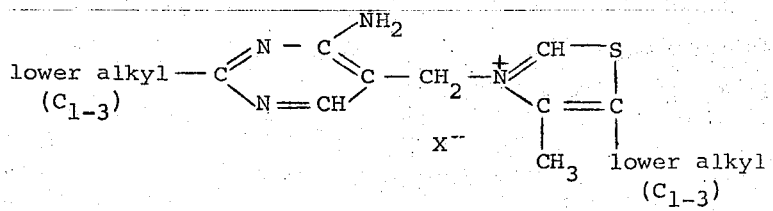

wherein $X^-$ is the anion, is effective in the treatment and/or prevention of coccidiosis in poultry, and is conveniently administered via drinking water or in a poultry feed composition or the like containing the mono salt in a concentration of 0.001 to 0.05 percent by weight, the said mono salt being storage stable and of low hygroscopicity.

6 Claims, No Drawings

TREATMENT AND PREVENTION OF COCCIDIOSIS IN POULTRY

This application is a divisional application of Ser. No. 7,362, filed on Jan. 30, 1970, which in turn is a continuation application of Ser. No. 621,753, filed on Mar. 9, 1967 and now abandoned.

The present invention relates to the treatment and/or prevention of coccidiosis in poultry.

Coccidiosis is an infectious fatal poultry disease and the treatment and prevention of the disease constitute one of the most important problems in the poultry industry.

Attempts have heretofore been made to treat the disease by means of various anti-coccidial agents. These known anti-coccicial agents, however, have such defects as weak activity and strong, unfavorable side-effects.

The present inventors have previously found that thiazolium quaternary salts (di-salts) of the formula:

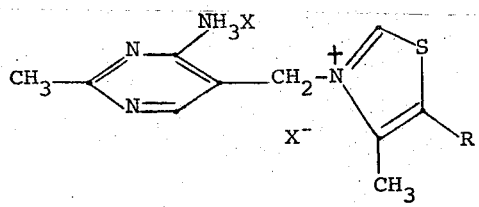

wherein R is a lower alkyl group with from 1 to 3 carbon atoms and each X⁻ is an anion, have an anti-coccidial effect against Coccidium (Eimeria sp.) and that these di-salts (a) possess a remarkable preventive and curative action against coccidiosis, and (b) do not show any unfavorable side-effect upon the growth of the poultry after treatment.

According to the present invention, thiazolium quaternary mono salts of the formula:

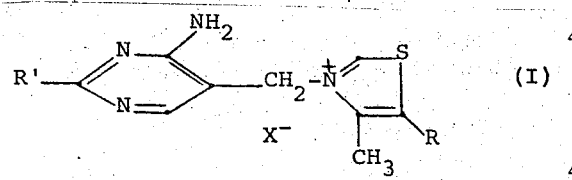

wherein each of R and R' is alkyl with from 1 to 3 carbon atoms (namely, methyl, ethyl, propyl, isopropyl), and X⁻ is $NO_3^-$, $NO_2^-$, $I^-$, $SCN^-$ or $ClO_4^-$, have a remarkable preventive and curative action against coccidiosis equal to (or greater than) the above mentioned di-salts, and also have the following advantageous characteristics:

1. They have higher storage stability than the di-salts.
2. They have a lower hygroscopic property than the di-salts.
3. As they do not have an electrostatic property, they can be easily admixed with a poultry diet.

The present invention provides compositions for the treatment and/or prevention of coccidiosis in poultry, which comprise a carrier and/or a diluent and a thiazolium salt of the above-mentioned formula (I), the concentration of the salt in the composition being from about 0.001 to about 0.05 percent by weight. It also provides a method of treating and/or preventing coccidiosis in poultry, in which an anti-coccidial amount of the thiazolium salt of the above-mentioned formula (I) is administered to poultry.

Typical compounds of formula (I) are:

3-(2-methyl-4-aminopyrimidin-5-yl-methyl)-4,5-dimethylthiazolium mono salt;
3-(2-methyl-4-aminopyrimidin-5-yl-methyl)-4-methyl-5-ethylthiazolium mono salt;
3-(2-methyl-4-aminopyrimidin-5-yl-methyl)-4-methyl-5-propyl-thiazolium mono salt;
3-(2-ethyl-4-aminopyrimidin-5-yl-methyl)-4,5-dimethylthiazolium mono salt;

("salt" referring to the nitrate, nitrite, iodide thiocyanate and/or perchlorate salt).

A compound of the formula (I) can be prepared, e.g., by reacting a compound of the formula:

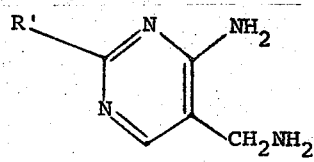

wherein R' is as precedingly described, with carbon disulfide and the appropriate 3-halo-alkan-2-one of the formula:

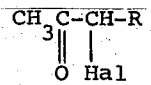

wherein R is as precedingly defined and Hal is a halogen atom, e.g., Cl, in the presence of a basic compound such as aqueous ammonia, alkali metal hydroxide or alkali metal carbonate to give 3-(2-alkyl-4-aminopyrimidin-5-yl-methyl)-4-hydroxy-4-methyl-5-alkyl thiazolidine-2-thione of the formula:

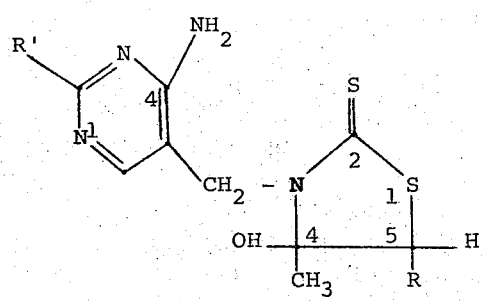

wherein each of R and R' is as precedingly defined, subjecting the compound of formula (III) to treatment with an inorganic acid such as hydrochloric acid, sulfuric acid or nitric acid or with an organic acid such as acetic acid or formic acid, and then treating the resultant compound of the formula:

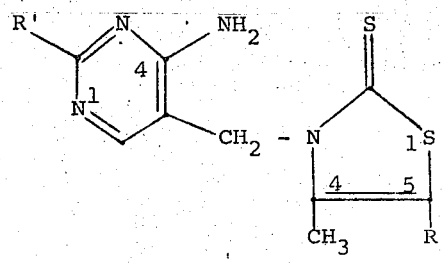

with an oxidizing agent such a hydrogen peroxide, bromine, potassium permanganate, potassium hypochlorite, etc.

A composition according to the present invention comprises a thiazolium quaternary mono salt of formula (I) as an active anti-coccidial ingredient dispersed in, or admixed with, a suitable carrier or diluent. The composition may be administered in such forms as powders, granules, tablets, suspension, emulsion or injection or advantageously is administered by admixing the active ingredient (I) with poultry diet or by dissolving in drinking water for the poultry, depending on various conditions such as the kind of poultry, the state of the poultry or the age of the poultry. The carrier or diluent preferably does not react with the active ingredient. Carriers or diluents suitable in the present compositions include, for example, wheat shorts, wheat flour, corn meal, soybean mill feed, soybean flour, vegetables, ground shells, fish meal, soybean grits, dried grains, fermentation residues, rice-bran, potato starch, lactose, sucrose, glucose, fructose, molasses solubles, antibiotic-containing mycelia, vitamins, crushed limstone, clay, etc.

The optimum concentration of the present composition depends to some extent on the kind of thiazolium salt employed, the kind of poultry or the purpose of the administration of the composition, that is prevention or curing. A composition of any desired concentration may be prepared by selecting proper diluents and by determining the proper ratio of carrier to active ingredient. In general, formulations containing from about 0.001 to about 0.05 percent, preferably from about 0.005 to about 0.025 percent by weight of active ingredient (I) in poultry diets or water are suitable for the treatment and prevention of the disease. When the thiazolium quaternary mono salts (I) are employed as therapeutic agents, the higher concentrations 0.0125 to 0.05 percent are preferably used. Intermediate formulations of a certain concentration are preferably prepared in advance of using suitable diluents or carriers, and added to the finished feed in administration to poultry in the required proportions. About 1 to 30 percent by weight of the thiazolium quaternary mono salt is convenient as the concentration of the intermediate formulations.

For the purpose of giving those skilled in the art a better understanding of the invention, the following illustrative test runs are given.

Test Run 1 (Anti-Coccidial Action)

Test Procedures:
1. Chicks: 9-day-old white leghorn males.
2. Infectious coccidium: Sporulated oocysts of *Eimeria tenella*
3. Administered compounds: As test compounds, each of
   a. 3-(2-methyl-4-amino-pyrimidin-5-yl-methyl)-4,5-dimethylthiazolium mono nitrate, and
   b. 3-(2-methyl-4-amino-pyrimidin-5-yl-methyl)-4,5-dimethylthiazolium mono thiocyanate, is employed in a concentration of 0.0063 percent in a per se conventional poultry feed. As a control compound (c), 3-(2-methyl-4-aminopyrimidin-5-yl-methyl)-4,5-dimethylthiazolium chloride hydrochloride (di-salt) is used in a concentration of 0.0063 percent in the said feed.

4. Method of test

Above-mentioned chicks are raised in isolation for 8 days and the condition of their health observed. They are weighed and divided into five groups consisting of five chicks each. The mean weight of each group is arranged to be equal. Two of the five groups are test groups and three are control groups. The chicks in each test group and in one control group are fed a diet containing said compounds (a), (b) and (c), respectively, and the infectious and non-infectious groups are fed a normal poultry diet. After 24 hours, each chick except those of the non-infectious group is inoculated orally with 100,000 oocysts of *Eimeria tenella*.

5. Observation

Mortality and bloody droppings in each group are recorded daily until the end of the test. Eight days after oocyst inoculation, all the survivors are sacrificed and examined pathologically.

6. Explanation of findings set forth in Table 1

Growth rate = [(About at the finish/Abw at the start)$^{-1}$] × 100

*Abw = Average body weight

Rate of growth = (growth rate of test group/growth rate of control group) × 100

Bloody droppings

Average drops of blood excreted from the intestine of each chick of each group.

Index of efficacy according to Johnson J. E. et al. (Annals of the New York Academy of Sciences, Vol. 53, pages 429–624 (1949)).

Index of efficacy is calculated as follows:

A.

| Caecal lesions | Equivalents |
|---|---|
| None | 0 |
| Trace | 1 |
| Slight | 2 |
| Moderate | 4 |
| Severe | 8 |

B.

| Oocysts in diluted caecal contents* | Equivalents |
|---|---|
| None per 20 fields | 0 |
| 1–5 per field | 1 |
| 6–50 per field | 2 |
| 51–150 per field | 4 |
| 150– | 8 |

* Caecal contents are diluted 10 times and observed with a microscope (Re "field," see Johnson et al., supra)

$x$: Average A. rating + Average B. rating in infectious group $y$: Average A. rating + Average B. rating in test groups Index of Efficacy = $x - y/x \times 100$ Note: When the value of x−y is a negative value, index of efficacy is deemed as 0.

Table 1

| | % by weight of compound in diet | Rate of increasing rate of body weight (%) | Bloody droppings day after | | | Index of efficacy |
|---|---|---|---|---|---|---|
| | | | 4 | 5 | 6 | |
| Test group | mono nitrate (a) 0.0063 | 103.9 | 0 | 0 | 0 | 71.1 |
| | mono thiocyanate (b) 0.0063 | 98.6 | 0 | 0 | 0 | 80.3 |
| | chloride | | | | | |

Table 1—Continued

| | | % by weight of compound in diet | Rate of increasing rate of body weight (%) | Bloody droppings day after | | | Index of efficacy |
|---|---|---|---|---|---|---|---|
| | | | | 4 | 5 | 6 | |
| Control group | hydrochloride (c) (di-salt) 0.0063 | | 92.4 | 0 | 0 | 0 | 61.3 |
| | Infectious control | | 65.7 | 3.2 | 6.0 | 3.1 | |
| | Non-infectious control | | 100.00 | 0 | 0 | 0 | |

As shown in Table 1, it is observed that 3-(2-methyl-4-aminopyrimidin-5-yl-methyl)-4,5-dimethylthiazolium mono nitrate and mono thiocyanate in the present invention have an effect substantially equal to that of the di-salt (c) against *Eimeria tenella* and that the test compounds do not cause any unfavorable effect on poultry.

Test Run 2

Test Procedures:
1. Chicks: Twelve-day-old white leghorn males.
2. Infectious coccidium: Sporulated oocysts of *Eimeria tenella*.
3. Administered compounds: As test compound, (a) 3-(2-ethyl-4-amino-pyrimidin-5-yl-methyl)-4,5-dimethylthiazolium mono nitrate, is employed in a concentration of 0.0031, 0.0063 and 0.0125 percent in a per se conventional poultry feed.
4. Method of test: Above-mentioned chicks are raised isolatedly for 11 days and the condition of their health observed. They are weighed and divided into five groups consisting of five chicks each. The mean weight of each group is arranged to be equal. Three of the five groups are test groups and two are control groups (i.e., infectious group and non-infectious group). The chicks in each test group are fed a diet containing said concentrations of compound (a), and the two control groups are fed a normal poultry diet. After 24 hours, each chick except those of the non-infectious group is inoculated orally with 50,000 oocysts of *Eimeria tenella*.
5. Observation: Mortality and bloody droppings in each group are recorded daily until the end of the test. Eight days after oocyst inoculation, all the survivors are sacrificed and examined pathologically.

The explanation of findings set forth in Table 1 is the same as in Test Run 1.

Table 2

| | % by weight of compound in diet | Rate of increasing rate of body weight (%) | Bloody droppings | | | Index of efficacy |
|---|---|---|---|---|---|---|
| | | | 3 days | 4 days | 5 days | |
| Test Group | mono nitrate (a) 0.0031 | 106.9 | 0 | 0 | 0 | 98.8 |
| | mono nitrate (a) 0.0063 | 105.2 | 0 | 0 | 0 | 100.0 |
| | mono nitrate (a) 0.0125 | 109.1 | 0 | 0 | 0 | 98.1 |
| Control Group | Infectious control | 80.7 | 1.0 | 2.4 | 3.6 | — |
| | Non-infectious control | 100 | 0 | 0 | 0 | — |

Test Run 3

1. Storage Stability

Each of test compounds (a), (b), (c) and (d) respectively is added to each of per se conventional grower feed and starter feed, respectively in a concentration of 250 γ/g calculated as 3-(2-methyl-4-aminopyrimidin-5-yl-methyl)-4,5-dimethylthiazolium (cation).

After these feeds are stored at 40°C for 2 weeks, the remaining amount of the active ingredient in each group is examined. The result is shown in Table 3.

Table 3

| Feed Salt | Remaining amount (per cent to initial amount) | |
|---|---|---|
| | Starter feed | Grower feed |
| Chloride hydrochloride (d) (di-salt) | 67.0 | 67.3 |
| mono nitrate (a) or (c)* | 82.4 | 84.0 |
| mono thiocyanate (b) | 81.4 | 84.9 |

* While the actual results are for (a), (c) shows the same or better results vis-a-vis the corresponding di-salt.

2. Hygroscopic property

After each salt (a), (b), (c) and (d) is kept standing at 4°C under a specific relative humidity for 7 days and 14 days, water content (percent) of each salt is examined. Result is shown in Table 4.

Table 4

| Salt | Initial water content | Relative humidity (%) | Water content (%) | |
|---|---|---|---|---|
| | | | After 7 days | After 14 days |
| Chloride hydrochloride (di-salt) (d) | 5.45 | 52 | 8.26 | 8.34 |
| | | 63 | 8.42 | 8.48 |
| | | 75 | 8.87 | 8.89 |
| Mono nitrate (a) or (c)* | 0.83 | 52 | 0.50 | 0.70 |
| | | 63 | 0.71 | 0.79 |
| | | 75 | 0.97 | 1.05 |
| Mono thiocyanate (b) | 6.02 | 52 | 6.06 | 6.00 |
| | | 63 | 5.76 | 5.99 |
| | | 75 | 5.73 | 5.79 |

* While the actual results are for (a), (c) shows the same or better results vis-a-vis the corresponding di-salt.

Note — Actual water content of thiocyanate is about 0.2 – 0.3 percent since thiocyanate has 1 mole (about 5.8 percent) of water of crystallization.

As shown in the results, the mono salts of the present invention have higher storage stability and lower hygroscopicity than the di-salt In the following examples of formulations of the composition, part (parts) or percent are shown on weight basis, unless otherwise stated. Parts by weight bear the same relation to parts by volume as do grams to milliliters.

EXAMPLE 1

Preparation of Active Ingredient 7.5 parts of 2-methyl-4-amino-5-aminomethylpyridine is dissolved in 40 parts by volume of hydrated methanol (water content: 20 weight percent). To the solution, there are added 23.4 parts of 28 percent aqueous ammonia, 4.2 parts of carbon disulfide and then 8.1 parts of 3-chlorobutan-2-one, and the mixture agitated for 4 hours at 50°C, whereupon a reaction takes place. The methanol is then distilled off under reduced pressure, and to the residue there is added 7.2 parts of concentrated hydrochloric acid, followed by heating 70°C for 1 hour. After cooling, an aqueous solution (5 percent) of sodium hydroxide is added to the solution and pH value is adjusted to 7, solid substance being thrown down. The solid substance is separated by filtration, washed with water and dried to give 13 parts of 3-(2-methyl-4-aminopyrimidin-5-yl-methyl)-4,5-dimethylthiazole-2-thione melting at 223°C. Yield 90 percent.

10 parts of 3-(2-methyl-4-aminopyrimidin-5-yl-methyl)-4,5-dimethylthiazole-2-thione is dissolved in 100 parts by volume of water. To the solution there is slowly added 10.2 parts of 30 percent hydrogen peroxide under agitation while the temperature is kept at 20°C. The resulting mixture is agitated for 2 hours, reaction taking place. 5.5 parts of sodium bicarbonate is added to reaction mixture to adjust the pH value to neutral range, followed by adding to the so-treated total mixture a concentrated aqueous solution of 2.5 parts of ammonium thiocyanate to give 8.0 parts of 3-(2-methyl-4-aminopyrimidin-5-yl-methyl)-4,5-dimethylthiazolium mono thiocyanate. (Yield 80 percent) M.P. 188°–190°C.

Elementary Analysis: $C_{12}H_{15}N_5S_2 \cdot H_2O$

|  | C | H | N |
|---|---|---|---|
| Calculated: | 46.28 | 5.50 | 22.49 |
| Found: | 45.89 | 5.36 | 22.21 |

In place of the above ammonium thiocyanate, a concentrated aqueous solution of 2.5 parts of sodium nitrate is employed to give 6.5 parts of 3-(2-methyl-4-aminopyrimidin-5-yl-methyl)-4,5-dimethylthiazolium mono nitrate. (Yield 68 percent).

After recrystallizing from hot water, the mono nitrate is in the form of colorless needles melting at 185°–188°C (decomposition).

Elementary Analysis: $C_{11}H_{15}N_5O_3S$

-Continued

|  | C | H | N |
|---|---|---|---|
| Calculated: | 44.43 | 5.08 | 23.55 |
| Found: | 44.26 | 5.20 | 23.35 |

The other mono salts of this invention are prepared in analogous manner.

EXAMPLE 2

The following components are admixed:

| 3-(2-methyl-4-aminopyrimidin-5-yl-methyl)-4,5-dimethylthiazolium mono thiocyanate | 25 parts |
|---|---|
| Wheat flour | 75 parts. |

0.05 part of the mixture is homogenously added to 99.95 parts of conventional diet for chicks.

Thus-prepared composition is fed to chicks

EXAMPLE 3

The following components are admixed:

| 3-(2-methyl-4-aminopyrimidin-5-dimethylthiazolium) mononitrate | 10 parts |
|---|---|
| Soybean flour | 85 parts |
| Sucrose | 5 parts |

0.05 part of the mixture is homogeneously added to 99.95 parts of conventional diet for breeders.

Thus-prepared composition is fed to breeders.

Example 4

The following components are admixed:

| 3-(2-methyl-4-aminopyrimidin-5-yl-methyl)-4,5-dimethylthiazolium mono thiocyanate | 20 parts |
|---|---|
| Fermentation residue | 80 parts |

0.05 part of the mixture is homogeneously added to 99.95 parts of conventional diet for breeders.

Thus-prepared composition is fed to breeders.

EXAMPLE 5

The following components are admixed:

| 3-(2-methyl-4-aminopyrimidin-5-yl-methyl)-4,5-dimethylthiazolium mono nitrate | 45 parts |
|---|---|
| Lactose | 35 parts |
| Sucrose | 20 parts. |

10 parts of mixture of dissolved in 10,000 parts by volume of water.

Thus-prepared composition is fed to chicks.

EXAMPLE 6

The following components are admixed:

| 3-(2-methyl-4-aminopyrimidin-5-yl-methyl)-4,5-dimethylthiazolium mono nitrate | 1 part |
|---|---|
| Grain flour | 88 parts |
| Calcium carbonate | 11 parts. |

0.03 part of the mixture is added to 99.97 parts of conventional diet for layers.

Thus-prepared composition is fed to layers.

EXAMPLE 7

The following components are admixed:

| | |
|---|---|
| 3-(2-methyl-4-aminopyrimidin-5-yl-methyl)-4,5-dimethylthiazolium mono nitrate | 1 part |
| Grain flour | 88 parts |
| Calcium carbonate | 11 parts |

0.03 part of the mixture is added to 99.97 parts of conventional diet for layers.

Thus-prepared composition is fed to layers.

Although the present invention has been described in conjunction with preferred embodiments, it is to be understood that essentially the same procedures can be followed with any of the herein-disclosed mono salts and with essentially the same or even superior results (vis-a-vis the di-salts). This is the case with the compounds wherein R and R' contain 3 carbon atoms each and is especially true of the 3-(2-methyl-4-aminopyrimidin-5-yl-methyl)-4,5-dimethylthiazolium mono nitrate.

If the effective amount, i.e., the anti-coccidial amount, of the thiazolium mono-salt to be administered according to the present invention is calculated in terms of the amount per 100 grams of the body weight of poultry, it may also be expressed as about 0.5 to 10 milligrams, preferably about 1 to 5 milligrams, per 100 grams of the body weight of poultry.

Having thus disclosed the invention, what is claimed is:

1. A method for the treatment or prevention of coccidiosis in poultry, which comprises administering to the poultry an effective amount of thiazolium mono salt of the formula

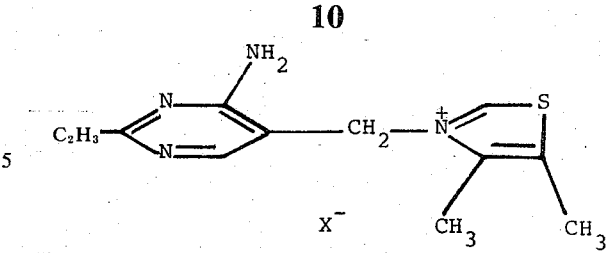

wherein $X^-$ is a member selected from the group consisting of $NO_3^-$, $NO_2^-$, $I^-$, $SCN^-$ and $ClO_4^-$.

2. The method according to claim 1, wherein said mono salt is 3-(2-ethyl-4-amino-pyrimidin-5-yl-methyl)-4,5-dimethylthiazolium mono nitrate.

3. A composition for the treatment or prevention of cocciodiosis in poultry, which consists essentially of 0.001 to 0.05 percent by weight of thiazolium mono salt of the formula

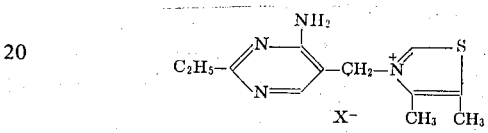

wherein $X^-$ is a member selected from the group consisting of $NO_3^-$, $NO_2^-$, $I^-$, $SCN^-$ and $ClO_4^-$, and a diluent therefor.

4. A composition according to claim 3 wherein said carrier or diluent is poultry feed.

5. A composition according to claim 3, wherein said carrier or diluent is drinking water.

6. A composition according to claim 3 wherein said mono salt is 3-(2-ethyl-4-amino-pyrimidin-5-yl-methyl)-4,5-dimethylthiazolium mono nitrate.

* * * * *